United States Patent [19]

Winters

[11] 4,111,220

[45] Sep. 5, 1978

[54] SHAKE RESPONSIVE VALVE

[75] Inventor: Harry K. Winters, San Rafael, Calif.

[73] Assignee: The Regents of the University of California, Berkeley, Calif.

[21] Appl. No.: 798,825

[22] Filed: May 20, 1977

[51] Int. Cl.² .............................................. F16K 17/36
[52] U.S. Cl. .................................. 137/39; 137/614.16
[58] Field of Search ......................... 137/38, 39, 614.16

[56] References Cited

U.S. PATENT DOCUMENTS

| 749,809 | 1/1904 | Truman | 137/614.16 |
| 2,585,316 | 2/1952 | Hobson | 137/38 |

Primary Examiner—Robert G. Nilson
Attorney, Agent, or Firm—Lothrop & West

[57] ABSTRACT

For use in an earthquake-prone environment, and especially as a gas valve, there is provided a valve body approximately symmetrical about a longitudinal axis and having a transverse intersecting plug bore through the body. A plug is rotatable in the bore to turn a passage through the plug from a position communicating with inlet and outlet ports into a position out of communication therewith. The plug bore merges with a valve seat in one position of the plug substantially coinciding with a plane forming a boundary of a chamber in the plug and normal to the usually vertical longitudinal axis. In one position of the plug, that plane is also coincident with a table forming part of the chamber boundary. There is a chamber wall upstanding from the table and having a distance from a pedestal upstanding from the table that increases as the wall approaches the plug. Also on the plug is a plug wall that extends around much of the valve seat and is in effect a continuation of the chamber wall. A ball in the chamber in one of its positions rests on the pedestal, but when dislodged therefrom by a shake having a horizontal component is supported on the pedestal rim and against the chamber wall and rolls by gravity down to another position on the valve seat blocking the passage. The ball is restored to the pedestal by a closing rotation of the plug, there being a centering notch in the plug wall to center the ball.

8 Claims, 5 Drawing Figures

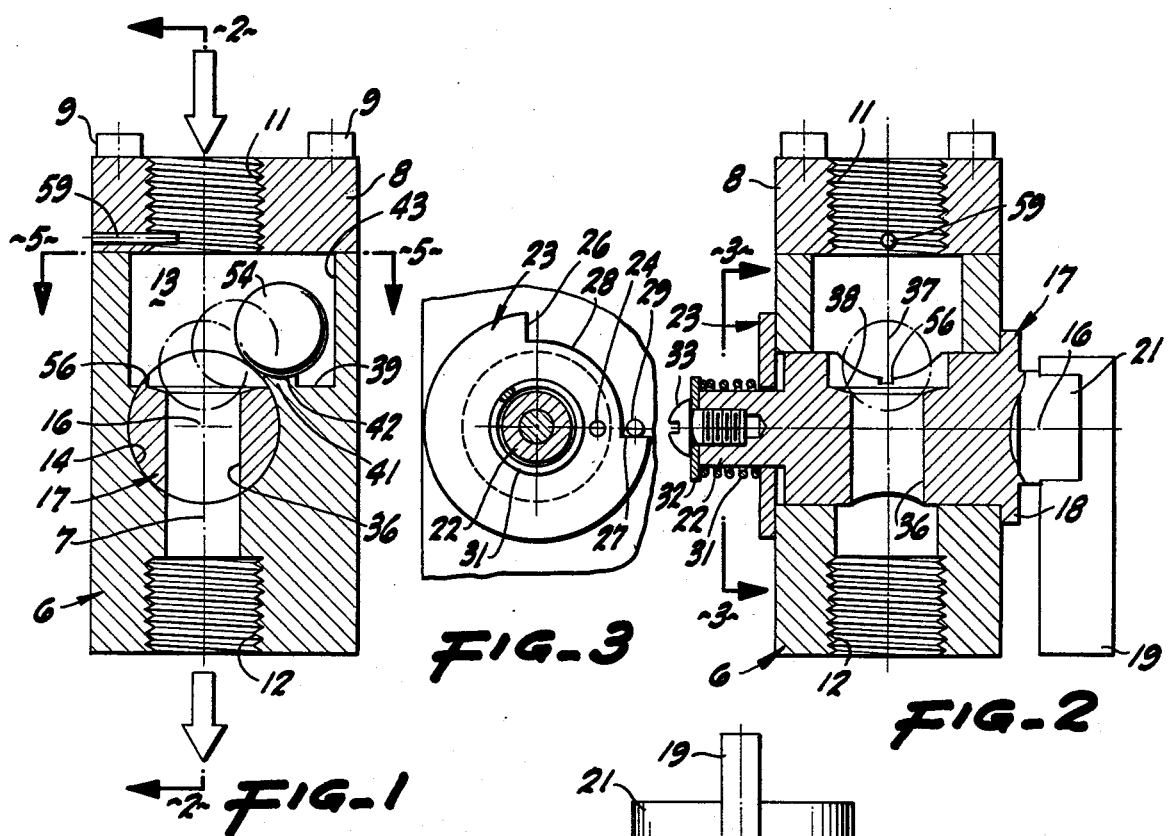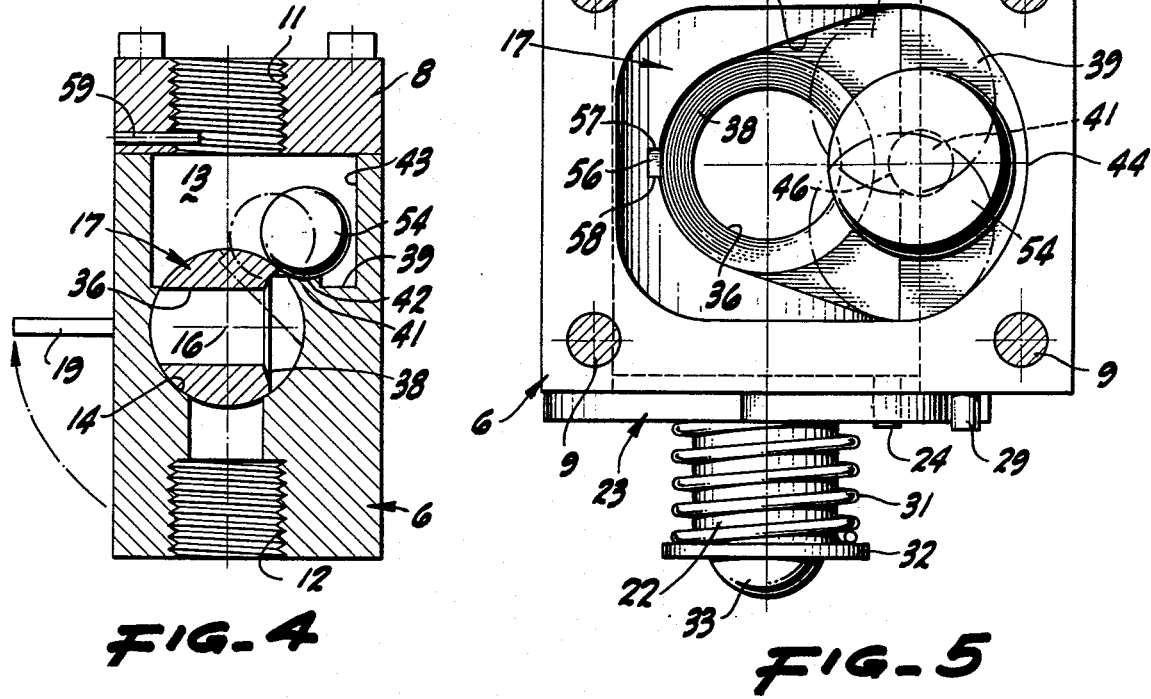

4,111,220

SHAKE RESPONSIVE VALVE

BRIEF SUMMARY OF THE INVENTION

In areas in which earthquakes may be expected, it is highly advantageous to have the supply of gas to a dwelling, for example, under the automatic control of a gas valve that normally is open but that automatically closes upon the occurrence of a shake of a predetermined minimum magnitude. The gas supply is thus immediately interrupted and precludes a gas-fed fire. While there are some valves for such purposes, they are relatively expensive and complex. Some serve not only to interrupt the gas supply, but automatically to restore the supply without adequate supervision. It is an aim of the present invention to provide an automatically operating gas valve of simple, economical nature that can remain available for a protracted period without any servicing but upon the occurrence of a shake of a predetermined magnitude will automatically block the gas supply. Furthermore, the supply cannot be restored without first manually closing the valve to make certain that the situation is in good order. Subsequently the valve can be opened for use. The construction is such that despite nonuse for many years, the mechanism is simple enough and direct enough to give assurance of functioning when required.

BRIEF DESCRIPTION OF THE SEVERAL VIEWS OF THE DRAWING

FIG. 1 is a cross-section through the longitudinal axis of a shake responsive valve pursuant to the invention.

FIG. 2 is a cross-section, the plane of which is indicated by the line 2—2 of FIG. 1.

FIG. 3 is a detail showing in cross-section, on the line 3—3 of FIG. 2, a part of the valve operating mechanism.

FIG. 4 is a view comparable to FIG. 1 but showing the plug in a different position.

FIG. 5 is a cross-section on the line 5—5 of FIG. 1, showing the interior portion of the valve to an enlarged scale.

DETAILED DESCRIPTION

In one effective embodiment of the invention, there is provided a main valve body 6. This is constructed of any suitable material such as brass or an appropriate plastic and conveniently is a block symmetrical about a longitudinal axis 7. In an installation, the axis 7 is arranged vertically. The body 6 carries a detachable cover 8 or top removably secured in position by fasteners 9. The cover is preferably bored and threaded to provide an inlet port 11 for gas inflow, whereas the body at the bottom is bored and threaded to provide an outlet port 12 for the gas. The gas flow is indicated by the arrows.

Within the body is a chamber 13, partially intersected by a cross bore 14 symmetrical about a bore axis 16 normal to and intersecting the longitudinal axis 7.

In the bore 14 and rotatable about the axis 16 is a plug 17 of any appropriate material. The plug can be tapered, but presently is disclosed as circular-cylindrical. The plug has a flange 18 at one end adapted to abut the side of the body 6 and likewise carries an operating lever 19 secured to a hub 21 forming part of the plug.

At its opposite end the plug is reduced to provide a boss 22 around which a positioning washer 23 is disposed. A pin 24 joins the positioning washer to the plug so that the washer and plug rotate together. The washer 23 is limited in its motion by end walls 26 and 27 at the opposite ends of a cutout portion 28. A pin 29 projecting from the body 6 serves as a stop for the walls 26 and 27. The washer 23 is held against the side of the body by a spring 31, also acting against a washer 32 held in place by a screw 33 in the end of the plug.

Within the plug there is a transverse plug passage 36, itself symmetrical about an axis 37. In one position of the plug the axis 37 is coincident with the axis 7, and in another position of the plug the axis 37 lies in a plane normal to the axis 7.

With the structure as so far described, the lever 19 can be turned into the position shown in FIGS. 1 and 2, and gas can flow from the inlet port 11 through chamber 13 and the plug passage 36 and then through the port 12 into a connecting pipe. When the lever 19 is turned at right angles to its position as shown in FIG. 2 and into a position as shown in FIG. 4, then the plug passage 36 is moved so that its axis 37 is normal to the longitudinal axis 7, and at least one end of the plug passage 36 is blanked by the adjacent interior wall of the bore, as shown in FIG. 4. Thus, the present valve can be utilized in the regular fashion as a standard flow and shutoff valve.

Particularly pursuant to this invention, the valve is afforded the additional capability of automatic shutoff in the event of a shake. For that reason, the plug 17 around one portion of the plug passage 36 is provided with a valve seat 38 lying approximately in a plane transverse to the plug axis 37. The seat is shallowly conical or slightly tapered. The seat plane is approximately occupied, in one rotated position of the valve plug, as shown in FIGS. 1 and 5, by a table 39 which serves as a bottom boundary of the chamber 13.

Upstanding from the table 39 is a pedestal 41. This is a boss, approximately circular in plan, and has a concave or indented upper surface 42. The pedestal slightly overlaps the bore 14. Surrounding the pedestal 41 and upstanding from the table 39 is a chamber wall 43 that has a particular configuration in plan, as shown in FIG. 5. At its median point 44, the radial distance between the margin or rim 46 of the pedestal 41 and the wall 43 is a minimum, but as the wall 43 moves away from the point 44 and approaches the plug passage 36 the wall 43 is radially farther and farther away from the margin 46 of the pedestal. The radial distance increases gradually in both directions from the midpoint. After having attained a maximum distance from the pedestal, slightly beyond the pedestal diameter, the wall 43 becomes straight and the two sides of the wall 43 adjacent the plug are parallel.

A related wall construction is utilized in the plug. Surrounding about half of the seat 38 on the side toward the pedestal 41, there is provided a flat 51 substantially in the same predetermined transverse plane as the table 39. The flat meets the tapered valve seat. In addition, bounding the flat is a side wall 52 in one rotated position of the plug substantially joining, consistent with the circular-cylindrical configuration of the plug, the surface of the wall 43 and the outside of the valve seat 38.

Disposed in the chamber 13 and normally resting in the depression 42 on the top of the pedestal is a ball 54, preferably steel. The size of the ball is such that in its position on the pedestal the ball is free and clear of all of the surrounding chamber boundaries. In another position of the ball, it rests well on the seat 38 and in that position blocks outflow of gas from the chamber 13 through the outlet port 12.

Normally the ball rests, as shown in FIGS. 1 and 5, on the pedestal. The valve can be operated by the lever 19 in the normal fashion without in any wise disturbing the ball 54. Upon the occurrence of minor shakes or vibrations having some transverse component, the ball is not particularly disturbed since the slight depression in the pedestal tends to hold the ball centered with the center of gravity of the ball over the center of the pedestal.

Should a shake occur with a transverse or horizontal component great enough to dislodge the ball and lift it over the slight rim 46 of the pedestal, the ball then in rolling off the pedestal may ride against or abut the wall 43. The ball then is entirely supported by the wall 43 and by contact with the rim 46 of the pedestal. In this position the center of gravity of the ball is slightly lower than it is when the ball rides over the rim 46. Furthermore, because of the increasing distance between the wall 43 (or the wall 52) and the pedestal rim, gravity acting on the ball causes it to roll downhill toward the seat 38. This is true for most of the directions in which the ball is dislodged.

Under some limiting circumstances, the ball can roll directly over the rim of the pedestal and onto the seat 38. Under one special circumstance, the ball can roll directly against the midpoint 44 of the wall 43. In that theoretical instance, there is no component tending to make the ball roll toward the seat, but if the transverse component of the shake is sufficient to dislodge the ball from the pedestal, then the ball bounces or reflects from the midpoint 44 and either overrides the pedestal or starts its downward journey in an arcuate path finally to lie on the seat 38.

In all of the other intermediate conditions, the ball simply rides by gravity down the imaginary ramp provided by the wall 43 and the pedestal rim 46 until it rolls across the flat 51 and into the seat, being guided if necessary by the plug wall 52. In this journey, the ball is generally above and free and clear of any debris and deposit on the flat 51 or the table 39 and, having momentary two-point support, is not impeded. Once poised over any portion of the seat, the weight of the ball is sufficient to cause the ball to roll to its lowermost, central position in tight abutment with the seat 38. There is thus provided an effective block or stop for through flow of gas.

In order to restore the ball and valve to open position, it is necessary to maneuver the lever 19 first to close the valve by rotating the plug 17. Such rotation, clockwise in FIGS. 2 and 4, tends to lift the blocking ball 54 from its lowermost position through successively higher positions, as illustrated in FIG. 1 by broken lines, back to its original position resting on the pedestal. This restoration is facilitated by a notch 56 cut in the central portion of the plug wall 52. This affords a pair of shoulders 57 and 58 resting against the surface of the ball either side of the central plane thereof, and so inhibits lateral shifting of the ball as it is restored to its pedestal. Final closing movement of the plug moves the ball to ride over the rim 46 of the pedestal and to resume its position within the depression 42 ready for further operation. It is then only necessary to rotate the lever 19 back to its previous position to restore the plug passage 36 to communication with the chamber 13 and the outlet port 12. The gas valve is again open and is ready for further service.

While it is not necessary when the valve is installed, it is convenient to have a blocking pin 59 in the removable cover 8 so that in transport and handling prior to installation the ball 54 cannot roll out of the chamber 13 through the inlet port 11.

I claim:

1. A shake responsive valve comprising a valve body approximately symmetrical about a longitudinal axis, means defining a plug bore through said body, said plug bore having a bore axis normal to said longitudinal axis, a plug in said plug bore and rotatable about said bore axis, means defining a plug passage in said plug, said plug passage having a passage axis in one rotated position of said plug being coincident with said longitudinal axis and in another rotated position of said plug extending across said longitudinal axis with said plug passage blanked by said valve body, means in said plut defining a valve seat extending substantially normally to said passage axis and in one rotated position of said plug being disposed in a predetermined plane normal to said longitudinal axis, means defining a flat on said plug substantially in said predetermined plane and merging with a portion of said valve seat, means defining a chamber in said valve body partially bounded by a table substantially in said predetermined plane and in one rotated position of said plug substantially merging with said flat, a pedestal on said valve body in said chamber and upstanding from said table, means defining a chamber wall upstanding from said table and disposed at a distance from said pedestal increasing toward said plug, means defining a plug wall upstanding from said flat extending around at least part of said seat and in one rotary position of said plug merging with said chamber wall, and a ball in said chamber adapted in one position to rest on said pedestal and in another position to occupy said valve seat.

2. A device as in claim 1 in which said upstanding chamber wall and said upstanding plug wall are substantially symmetrical about a plane normal to said plug axis and containing said longitudinal axis.

3. A device as in claim 2 in which said plug side wall in substantially its lowest portion has a notch symmetrical about said plane.

4. A device as in claim 1 in which said pedestal has a concave top.

5. A device as in claim 1 in which when said longitudinal axis is vertical, said pedestal and said upstanding chamber wall and said upstanding plug wall present a continually lower support to said ball as said ball moves from said pedestal to said valve seat.

6. A device as in claim 1 including ports in said valve body leading from the exterior into said chamber and from said plug bore to the exterior.

7. A device as in claim 1 in which said ball is lifted from said valve seat to said pedestal by contact with a portion of said plug rotating from open position to closed position.

8. A device as in claim 7 in which said portion of said plug includes shoulders disposed to abut spaced portions of said ball.

* * * * *